United States Patent [19]

Benkmann

[11] 4,315,759
[45] Feb. 16, 1982

[54] ADSORPTION PROCESS PRODUCING CHRONOLOGICALLY CONSTANT AMOUNT OF A RESIDUAL GAS

[75] Inventor: Christian Benkmann, Munich, Fed. Rep. of Germany

[73] Assignee: Linde Aktiengesellschaft, Hollriegelskreuth, Fed. Rep. of Germany

[21] Appl. No.: 171,519

[22] Filed: Jul. 23, 1980

[30] Foreign Application Priority Data

Jul. 28, 1979 [DE] Fed. Rep. of Germany ....... 2930782

[51] Int. Cl.³ .............................................. B01D 53/04
[52] U.S. Cl. .......................................... 55/18; 55/25; 55/58; 55/62; 55/161; 55/179; 55/387
[58] Field of Search .................... 55/18, 20, 21, 25, 26, 55/58, 62, 68, 74, 75, 161–163, 179, 180, 389, 387

[56] References Cited

U.S. PATENT DOCUMENTS

| | | | |
|---|---|---|---|
| 3,703,068 | 11/1972 | Wagner | 55/21 |
| 3,775,946 | 12/1973 | Brazzel | 55/161 X |
| 4,101,298 | 7/1978 | Myers et al. | 55/163 |
| 4,197,095 | 4/1980 | White, Jr. et al. | 55/21 X |
| 4,234,322 | 11/1980 | De Meyer et al. | 55/25 X |

FOREIGN PATENT DOCUMENTS

1919557 11/1969 Fed. Rep. of Germany .
2624346 12/1977 Fed. Rep. of Germany ......... 55/25

Primary Examiner—Robert H. Spitzer
Attorney, Agent, or Firm—Millen & White

[57] ABSTRACT

An adsorption process for purifying or fractionating a gaseous feed mixture comprises an adsorption phase, at least one expansion phase, a purging phase and at least one pressure build-up phase. The expansion phase(s) and the purging phase produce residual process gas fractions. The sum total of volume, and/or mass streams of the residual process gas fractions comprises a residual gas stream which is maintained chronologically substantially constant by controlling the volume and/or gas streams of the gas entering the purging phase and maintaining the gas leaving the expansion phase(s) at a substantially constant value, dependent on the desired mass and/or volume quantity of the residual gas stream. The length of the purging phase and of the expansion phase(s) is adjusted accordingly so that the relationship of the length of time of the purging phase to the length of time of the expansion phase(s) is substantially the same as the relationship of the volume and/or mass of the gas fractions obtained during the purging to those obtained during the expansion phase(s), respectively. The control of the purging and of the expansion phase(s) can also be varied in response to a flow rate of a feed gas entering the process.

15 Claims, 8 Drawing Figures

ADSORPTION PROCESS PRODUCING CHRONOLOGICALLY CONSTANT AMOUNT OF A RESIDUAL GAS

BACKGROUND OF THE INVENTION

This invention relates to a process for the adsorptive purification or fractionation of gaseous mixtures using several cyclically reversible adsorbers.

A similar process is disclosed, for example, in DOS [German Unexamined Laid-Open Application] 1,919,557. In that reference (FIGS. 4 and 5), there is illustrated and described a process which operates with four cyclically reversible adsorbers, wherein, in a pressure swing operation, the adsorption phase is succeeded by three expansion phases, a purging phase, and two pressure build-up phases. The first expansion phase takes place in pressure equalization with the first pressure build-up phase of another adsorber; the gaseous fraction discharged during the second expansion phase, operated cocurrently, is used to purge another adsorber; and the gaseous fraction obtained during the third and last expansion phase, operated countercurrently, is withdrawn directly as a residual gas. The gaseous fraction obtained during the course of the purging phase, operated at the lowest pressure, is also discharged as a residual gas. Accordingly, the residual gas is continuously discharged, namely alternatively from the countercurrent expansion phase and from the purging phase. The first pressure build-up phase is conducted in pressure equalization with the first expansion phase of another adsorber, and by the introduction of a purified product gas. The second pressure build-up phase takes place exclusively with a purified product gas.

In this prior art process, voluminous regulating measures are necessary to obtain a constant stream of a product gas. Such regulating measures are necessary because constantly purified product gas, in periodically fluctuating amounts is branched off during the adsorption phase for the pressure build-up stages. A similar control for the residual gas stream, however, is not provided. Thus, it can be of considerable disadvantage, if the adsorbed components, entrained by the residual gas, are used for some commercial application and it is important to maintain a substantially constant flow of the residual gas. The residual gas in the conventional process, however, is obtained with substantial periodic fluctuations. The flow of the volume stream or mass stream of the residual gas decreases substantially during the countercurrent expansion phase. In contrast, after the expansion phase, it substantially increases at the beginning of the purging phase and then decreases again at the end of the purging phase. To compensate for such fluctuations, it is necessary to use buffer tanks, which can assume considerable dimensions and cause correspondingly high costs in initial capital investment.

The problem of compensating for the fluctuations occurring in the residual gas is also posed in pressure swing adsorption processes operating with more than four adsorbers and more than three expansion phases. Thus, for example, in the process of DOS [Unexamined Laid-Open Application] 2,624,346, a buffer tank must be provided for the exiting residual gas. This buffer tank is required even in this process although, with an increase in the number of adsorbers and the resulting increase in the number of expansion phases and the pressure build-up phases, the fluctuations occurring in the thus-obtained gaseous streams are generally diminished. In the process of DOS 2,624,346, operating with nine adsorbers, the first and the second expansion phases follow the adsorption phase, each of these expansion phases being operated in pressure equalization with corresponding pressure buildup phases of other adsorbers. Subsequently, the adsorber undergoes: a third expansion phase yielding a purging gas for another adsorber; a fourth expansion phase operated in pressure equalization with the first pressure build-up stage of the just-purged adsorber; a fifth expansion phase yielding a gaseous fraction introduced directly into the residual gas conduit; a purging phase with the use of the gaseous fraction obtained during the third expansion phase of another adsorber as the purging gas; and the four pressure build-up phases, the first three of which are operated in pressure equalization with corresponding expansion phases of other adsorbers, purified product gas being required for the last of these pressure build-up phases. In this mode of operation, strong fluctuations also occur in the residual gas upstream of the buffer tank, since the total residual gas stream is comprised of volumetrically different gas streams obtained chronologically simultaneously from the fifth expansion phase and from the purging phase of two adsorbers, from the chronologically simultaneous purging phases of the same two adsorbers, and from the purging phase of one adsorber.

Gaseous mixtures purified and/or separated according to the process of DOS 2,624,346 yield valuable residual gas components. For example, raw hydrogen can be purified according to that process and the residual gas obtained therein still possesses considerable heating value. If such a gas is to be used in a subsequent combustion process, it is generally desirable to avoid fluctuations in the supply of the gas. In the case of the fractionation of natural gas according to that prior art process, the residual gas is comprised of a considerable amount of methane and other light hydrocarbons. If it is desired to separate the methane from the other hydrocarbons, it is also desirable to maintain a chronologically constant supply of the residual gas.

SUMMARY OF THE INVENTION

The primary object of the invention is to provide a process of the aforementioned type which compensates for the fluctuations of the total mass or volume flow of the residual gas stream in an economical manner.

Upon further study of the specification and appended claims, further objects and advantages of this invention will become apparent to those skilled in the art.

These and other objects have been attained according to the invention by withdrawing as the residual gas stream a chronologically substantially constant volume stream or mass stream by regulating the volume or mass streams of the gaseous fractions obtained during the expansion phase, withdrawn as a residual gas, and of the purging gases, introduced during the purging phases into the adsorbers.

The essence of the invention accordingly resides in that the compensation in the volume or the mass of the residual gas obtained is not effected after the actual adsorption process, for example, with the aid of buffer tanks, but instead, this compensation is accomplished early in the process, preferably during the course of the adsorption process itself by a suitable regulating means. A suitable regulating procedure is performed according to the invention at different points in the process. Thus, the volume or the mass stream of the gaseous fraction exiting as the residual gas during an expansion phase is regulated directly after leaving the adsorber, while the residual gas fraction obtained from the purging phase is regulated indirectly by adjusting the volume or the mass stream of the purging gas entering the adsorber to be purged. The influence of the regulating step thus takes place in case of the exiting expansion gas downstream of the adsorber, and, in case of the exiting purging gas entraining desorbed components, upstream of the adsorber.

The main advantages of the process of this invention reside in that the buffer tanks if the prior art can be entirely eliminated, or at least can be considerably reduced in size, if there remain fluctuations in the residual gas concentration which must be compensated for. Since the residual gases are generally obtained at a relatively low pressure, the buffer tanks must either have a correspondingly large volume, or the residual gases must be compressed by additional compressors. Thus, the elimination of both of these disadvantages results in considerable financial and space economies. In addition, the process of this invention can be carried out in a simple manner with conventional apparatus.

The invention is especially suitable for use with substantially adiabatic pressure swing adsorption processes. However, the invention can also be used with processes other than pressure swing processes, even if a heated purging gas is employed in an adsorption process.

The number of adsorbers used in the process is significant only to the extent that the process must comprise at least one expansion phase, yielding a residual gas, and one purging phase. This requires a certain minimum number of adsorbers, depending on the manner of operation of the process. The minimum number of adsorbers is three if, in addition to the expansion phase yielding residual gas, there is at least one additional expansion phase operated in pressure equalization with another adsorber. An especially economical mode of operation comprises using as the purging gas, gaseous fractions obtained from the adsorbers during one or several expansion phases, which requires a minimum of four adsorbers if at least one pressure equalization phase is provided.

In one embodiment of the invention, wherein relatively few adsorbers are used, the residual gas is withdrawn only from a single adsorber, and the total amount of the residual gas comprises successively obtained gaseous fractions discharged alternatively from the expansion phases and the purging phases, and the volume streams or the mass streams of these gaseous fractions are maintained chronologically substantially constant. However, the more adsorbers are used, the more likely it is that residual gas is withdrawn from at least two adsorbers simultaneously, at least during a portion of each switching cycle. In such a case, the sum total of the volume or mass streams of the simultaneously obtained gaseous fractions withdrawn as components of the residual gas stream is also maintained at a chronologically substantially constant value. This method requires increased expenditure in control instrumentation but it is more economical, because with an increased number of adsorbers, the expansion gases can be better and more efficiently utilized, and the purified product gas is required only in the last pressure build-up phase, if that phase is not already charged with a raw gas.

It is necessary to chronologically distribute the switching cycles in such a manner that the lengths of the purging and of the expansion phases, yielding residual gas are in the same relationship to each other as the total volumes or masses of the gaseous fractions obtained during these phases. This is a direct result of the required constancy of the total volume or mass streams of the residual gas. The difference between volume streams and mass streams resides in that, in the case of a volume stream, the density of the gas or the gaseous mixture is irrelevant, whereas the density becomes an important factor in the case of a mass stream. With a constant composition and constant total pressure of a gaseous stream, the quantity of the volume stream is directly proportional to that of the mass stream. However, if, for example, the composition of the gaseous stream changes during a period of time, then a corresponding change occurs in the mass stream, although the volume stream remains constant.

It will be obvious to those skilled in the art that the total mass stream can be adjusted in response to the composition changes of the feed gas by installing a suitable sampling device, e.g., process chromatograph in the feed stream. The sampling device would periodically sample the feed stream, evaluate its composition and relay that data to a control device (e.g., a process computer) which would make appropriate adjustments in the total mass stream in response to the changing composition of the feed gas.

The regulation of the volume or mass streams can be effected in a relatively simple manner by means of controllable valves. It is usually necessary to enlarge the free cross sections of these valves as a function of time during the individual control segments. This is particularly important for the expansion phases yielding residual gas, since in these phases the pressure of the residual gas decreases as a function of time. Thus, to keep the volume stream constant, the throughflow cross section of the corresponding control valve must be constantly enlarged. This is not necessarily true in all instances for the mass stream, since it is possible that desorbate may consist of comparatively very heavy molecules and the pressure drop is thus at least partially compensated for.

In the purging phase, generally conducted with the gas obtained in the expansion phase, the mode of operation is dependent to a larger extent on each individual case, because the major goal of the process control in this phase is the regulation to the total mass and/or volume streams of the purging gas stream introduced into the adsorber. In addition, the desorption characteristic of the desorbate gas fraction plays a decisive role in the purging phase, thereby further contributing to a greater sensitivity of the mode of operation of this phase to diverse processes and operating conditions.

The valves used to control the volume or mass streams can be activated by chronologically linear variable signals. This means the valve stroke during a given phase changes at a constant speed over a period of time. The valves utilized for that purpose have stroke-dependent opening characteristics adapted to the respectively required curve of the degree of a valve opening variable with time, in order to obtain constant mass or volume residual gas streams.

Depending on the process conditions, it is generally necessary to vary the valve opening in a specific manner not necessarily chronologically linear. Therefore, if a valve is activated in a chronologically linear manner described above, it is necessary to utilize a specially constructed valve wherein the opening made available by the valve as a function of a linear time signal is determined, for example, by the configuration of the valve body. In a valve having such a configuration, the opening characteristics are determined by the relationship between the cross-sectional area of the opening freed for the fluid stream and the valve stroke. This mode of operation is advantageous in that the linear signal generators can be used, whose use, however, necessitates the utilization of relatively complicated valves specifically adapted in their construction to an individual process. p
It is also possible to use valves having a linear stroke-dependent opening characteristic for controlling the volume or mass streams. The required chronological change in the degree of valve opening is effected in such valves by a correspondingly shaped, nonlinear activating signal. This mode of operation has the advantage that conventional valves of a simple construction can be employed. However, an increased expenditure is incurred in such a mode of operation because of the necessity of generating the nonlinear activating signals.

Various possibilities, readily apparent to those skilled in the art exist for the generation of the activating signals. These signals can be generated, for example, by a process computer or a pneumatically, hydraulically or electronically operating controller.

To provide the process with additional flexibility, the duration of the switching cycles is varied in response to the amount of throughput (the flow rate) of the gaseous mixture to be purified and/or to be fractionated. This is accomplished, for example, by decelerating or accelerating the activating signals of the controllable valves which regulate the volume or mass streams by a corresponding factor dependent on the quantitative throughput. For this purpose it is necessary to provide means, such as a conventional measuring unit, for sensing and measuring any changes in the quantity of the raw gas introduced into the adsorption plant. The thus-measured values are then fed to the control device which thereupon causes the necessary, generally proportional reductions or extensions of the switching cycles and of the individual phases within the cycles. As would be apparent to those skilled in the art, the control program can be designed so that a change in the switching cycles and phases is effected only if a long-term change in the raw gas stream supply is detected, which can be achieved, e.g., by averaging the measured values over several, e.g., 4 to 6, switching cycles.

The process of the invention is extremely versatile regarding its applicability. It is not subject to any limitations either with respect to the selection of the adsorbent or of the gaseous mixtures to be treated, except for the obvious requirement that the gaseous mixture must contain at least one component preferably adsorbable by the adsorbent. The essence of the invention obviously does not concern such details as the choice of an adsorbent, but rather resides exclusively in the way and manner in which the process is conducted.

The invention will be described in greater detail below with reference to two specific embodiments and the figures pertaining thereto.

However, the preferred specific embodiments described below are to be construed as merely illustrative and not limitative of the remainder of the disclosure in any way whatsoever.

DETAILED DESCRIPTION

Figure 1:
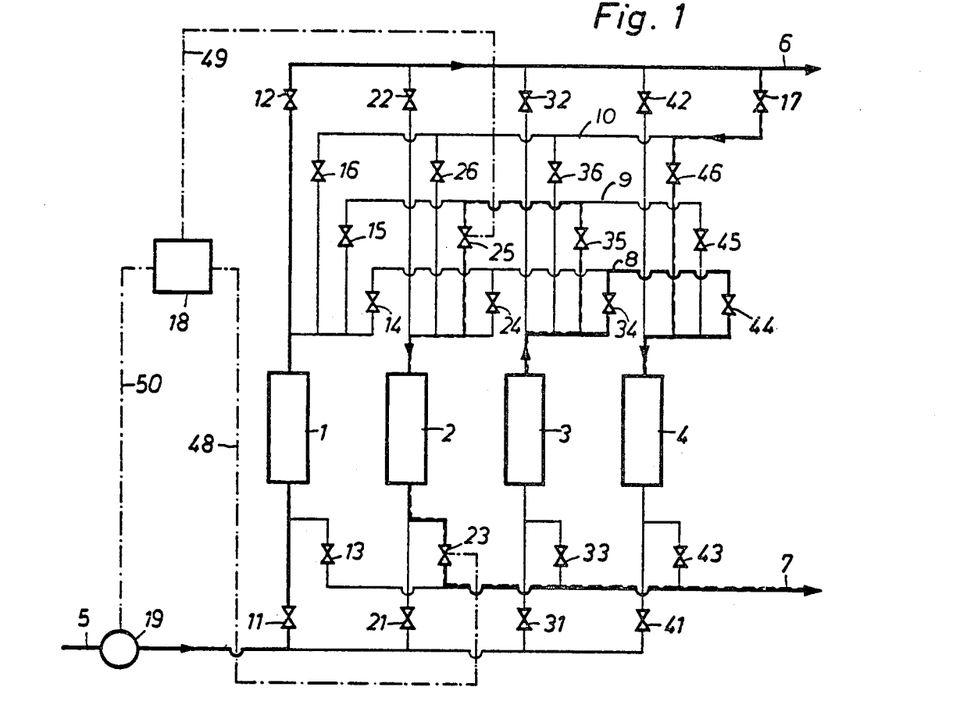
FIG. 1 is a flow sheet of the process of this invention used in an adsorption plant operated with four cyclically reversible adsorbers.

FIG. 1 illustrates four cyclically reversible adsorbers 1, 2, 3 and 4, each passing through identical switching cycles. Raw feed gas, which is to be treated for the purpose of purification or fractionation is compressed to the adsorption pressure, and introduced through a conduit 5 into the process. A product gas free of the adsorbed components is discharged through a conduit 6 and residual gas enriched in the adsorbed components is removed through a conduit 7. The outlet ends of the adsorbers 1 through 4 (i.e., top portions of the adsorbers illustrated in FIG. 1) are connected with each other through a pressure equalization conduit 8, a purging gas conduit 9, and a pressure gas conduit 10. Pairs of valves 11 and 12, 21 and 22, 31 and 32, and 41 and 42 for the adsorbers 1, 2, 3 and 4, respectively, provide for the feeding into and discharging from the adsorbers of the gaseous mixture to be treated, i.e., the raw feed gas, and the product gas obtained after adsorption of the undesired components. The residual gas conduit 7 is connected through valves 13, 23, 33 and 43 to the inlet sides of the adsorbers 1 through 4, respectively. Valves 14, 24, 34 and 44 are disposed between the pressure equalization conduit 8 and the outlet sides of the adsorber 1 through 4, respectively; valves 15, 25, 35 and 45 connect the purging gas conduit 9 with the outlet side of the adsorbers 1 through 4, respectively; and valves 16, 26, 36 and 46 connect the pressure gas conduit 10 to the respective adsorber outlets. The pressure gas conduit 10 furthermore communicates with the product gas conduit 6 through a valve 17. The valves 13, 23, 33, 43 and 15, 25, 35, 45 are controllable valves; the valves 14, 24, 34, 44 and 16, 26, 36, 46 can be controllable valves or switching valves, whereas all of the remaining valves are switching valves.

The duration and chronological sequence of the switching cycles and the volume or mass streams of the residual gas withdrawn through the residual gas conduit 7 are adjusted by a control device 18. The control device 18, which can be, e.g., process computer supplies the switching pulses for all of the switching valves and the activating signals for the controllable valves 13, 23, 33, 43 and 15, 25, 35, 45. Only two signal lines 48, 49 conveying activating pulses for the controllable valves 23 and 25 are illustrated in the figure. The remaining signal lines are not shown for the sake of clarity. However, it will be readily apparent to those skilled in the art that each of the aforementioned valves must be connected to the control device 18 in a conventional manner. If the controllable valves 13, 23, 33, 43 and 15, 25, 35, 45 are valves having linear opening characteristics, then data regarding the temporal (chronological) profile of the activating signals must be fed into the control device. In such a case, the control device is preferably a programmable process computer. Values measured by a conventional throughput quantity measuring unit 19 are fed to the computer through a measuring line 50. The process computer produces, by measuring a throughput of the feed gas and by averaging it over several switching cycles, a factor dependent on the average throughput quantity of the raw feed gas. This factor decelerates or accelerates the activating signals. The time intervals between the switching pulses fed to the switching valves are affected correspondingly.

Figure 2:
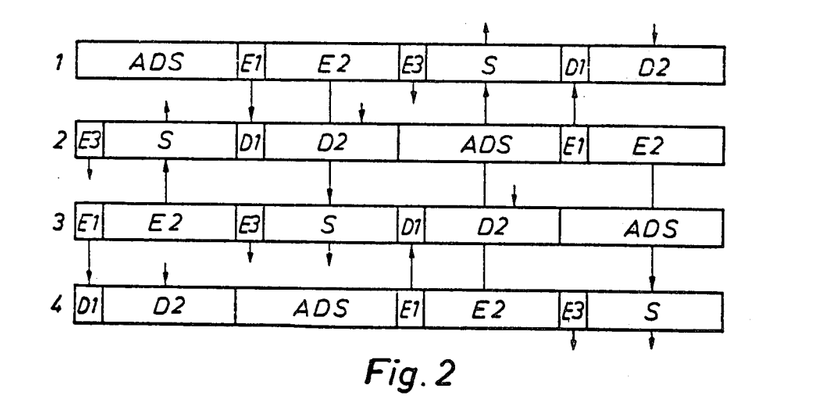
FIG. 2 is an operating sequence diagram for the process of FIG. 1.

FIG. 2 illustrates the operating sequence diagram of the process of FIG. 1. Each of the four adsorbers 1 through 4 is represented by one of the horizontally arranged bars. A single switching cycle comprises an adsorption phase ADS, three expansion phases E1, E2, E3, a purging phase S, and two pressure build-up phases D1 and D2. The four adsorbers 1–4 pass through these switching cycles in an identical fashion with chronological displacement, within one-quarter of the duration time of one switching cycle. Bold and dashed lines illustrate in FIG. 1 the flow of gases during the first quarter of a switching cycle, illustrated in FIG. 2 as the first quarter of each of the horizontal bars on the left-hand side of FIG. 2, i.e., the ADS phase of the adsorber 1, the E3 and the S phases of the adsorber 2, etc. This quarter of the cycle in all of the adsorbers is representative of the entire switching cycle. The bold lines represent the adsorption phase ADS, the first and third expansion phases E1 and E3, respectively, and the first pressure build-up phase D1, while the dashed lines represent the second expansion phase E2, the purging phase S, and the second pressure build-up phase D2.

Simultaneously with the adsorption phase ADS of the adsorber 1, which takes place while the valves 11 and 12 are opened, the adsorber 3 is first subjected to its first expansion phase E1, during which a gas comprised substantially of a gas remaining in the void volume of the adsorbent packing in the adsorber 3, is passed into the adsorber 4 through the opened valves 34 and 44. The adsorber 4 is at that time in its first pressure build-up phase D1 during which pressure equalization also takes place.

This pressure equalization takes place during a relatively short time as compared to the duration of the adsorption phase.

Pressure equalization is finished when a first intermediate pressure has been reached.

During this time, the adsorber 2, which is in its third and last expansion phase E3, is placed at the lowest process pressure from its inlet side through the opened valve 23. The thus-discharged gas, enriched in the previously adsorbed components, is withdrawn through the residual gas conduit 7. The control valve 23, activated through the signal line 48 by the process computer 18, opens its throughflow cross section in a predetermined fashion, in response to a corresponding ascending profile of the activating signal.

After conclusion of the three simultaneously occurring phases E1, D1 and E3, the adsorber 1 still remains in the ADS phase while the adsorber 2 enters the purging phase S, the adsorber 3 enters the second expansion phase E2, and the adsorber 4 enters the second pressure build-up phase D2. At this point in time, the outlet sides of the adsorbers 3 and 2 communicate with each other through the opened valves 35 and 25 and through the purging gas conduit 9. The adsorber 3, initially at the first intermediate pressure is relieved during this step to a second intermediate pressure. The gaseous mixture exiting from the adsorber 3 contains more of the adsorbed components than the stream obtained during the first expansion phase E1. This gaseous mixture flows countercurrently through the adsorber 2 (cocurrent direction being the direction of gas flow during the adsorption phase), absorbs the components desorbed from the adsorbent packing of this adsorber, and is discharged into the residual gas conduit 7 through the opened, controllable valve 23. During the entire purging phase S, there exists a positive, although diminishing, pressure differential between the adsorbers 3 and 2, since the adsorber 2 is at the lowest process pressure after passing through the third expansion phase E3. The regulation of the quantity of the purging gas introduced into the adsorber 2 through the purging gas conduit 9 is accomplished by the control valve 25, which is activated through the signal line 49 by the process computer 18 with a predetermined, nonlinear signal. The valves 35 and 23 remain widely opened during the purging phase (in the adsorber 2) or the second expansion phase (in the adsorber 3). Simultaneously, the adsorber 4 is brought from the aforementioned first intermediate pressure to the adsorption pressure introduced into the absorber 4 through the opened valves 17 and 46 and through the corresponding section of the pressure gas conduit 10, as shown in FIG. 1.

The process is continued with the remaining adsorbers 1, 3 and 4 operated and controlled in a similar manner as the adsorber 2.

EXAMPLE 1

Hydrogen recovery from steam reformer gas with a plant as illustrated in FIGS. 1 to 4.

Feedgas 270 kmol/h containing: 75 mol-% $H_2$, 3 mol-% CO, 2 mol-% $CH_4$ and 20 mol-% $CO_2$ feed gas pressure 17 bar (abs)

| product gas | 162 kmol/h $H_2$ |
| | 99.99 mol-% $H_2$ |
| product gas pressure | 16.5 bar (abs) |
| residual gas | 108 kmol/h containing 37.5 mol-% $H_2$, 7.5 mol-% CO, 5 mol-% $CH_4$, 50 mol-% $CO_2$ |
| residual gas pressure | 1.3 bar (abs) |
| adsorption time | 240 seconds |

TABLE 1

| Phase | | E 1 | E 2 | E 3 | S | D 1 | D 2 |
|---|---|---|---|---|---|---|---|
| time | seconds | 30 | 210 | 30 | 210 | 30 | 210 |
| pressure at end of phase | bar (abs) | 9.6 | 2.6 | 1.3 | 1.3 | 9.6 | 17 |
| mean flow rate | mol/s | 49.5 | 14 | 30 | 30 | 62.9 | 13.4 |
| gas composition | | | | | | | |

TABLE 1-continued

| Phase | E1 | E2 | E3 | S | D1 | D2 |
|---|---|---|---|---|---|---|
| H$_2$ content mol-% | 99.98 | 99.8 | 47 | 36 | 99.98 | 99.99 |

It will be obvious to those skilled in the art that the schedule of Table 1 is merely illustrative. From the above description, it will also be apparent to workers skilled in the art how to control the degree of opening of the respective valves in response to changing process conditions and for various process gases.

Figure 3:
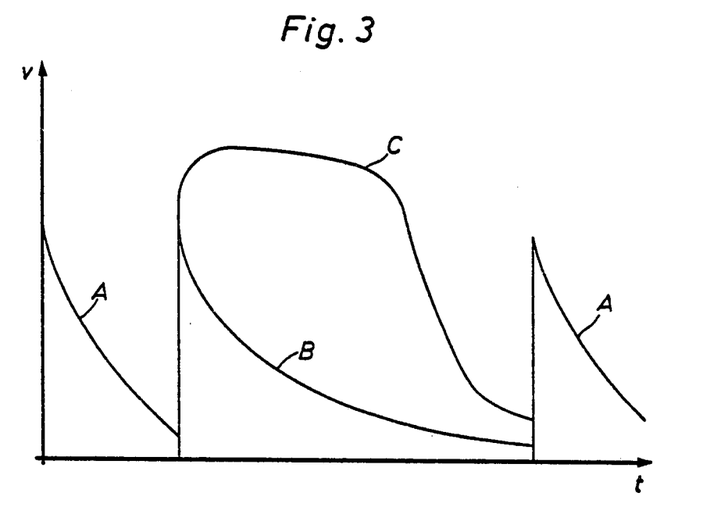
FIG. 3 is a diagram representing the volume stream of the withdrawn residual gas as a function of time for a conventional prior art process operating with four adsorbers.

FIG. 3 is a diagram of the volume stream of the residual gas as a function of time for a conventional process operating with four adsorbers in a manner substantially similar to the process of FIG. 1, but without the inventive features of the present invention. To help in understanding the diagram of FIG. 3, it is also possible to refer to the operating sequence diagram of FIG. 2. In FIG. 3, the ordinate represents the volume stream, the abscissa represents the time. Curves A and C designate volumetric flow of the residual gas streams discharged during the third expansion phases E3 and/or the purging phases S. Curve B designates the volumetric flow of the purging gas stream introduced for purging the respective adsorber. The purging gas stream is obtained from a second expansion phase E2. The volumetric difference between the curves C and B corresponds to the proportion of desorbed components in the residual gas discharged during the purging phase S. It can be clearly seen from the curves that in the prior art processes, a strongly fluctuating residual gas stream was produced without the use of the inventive features of the present invention.

Figure 4:
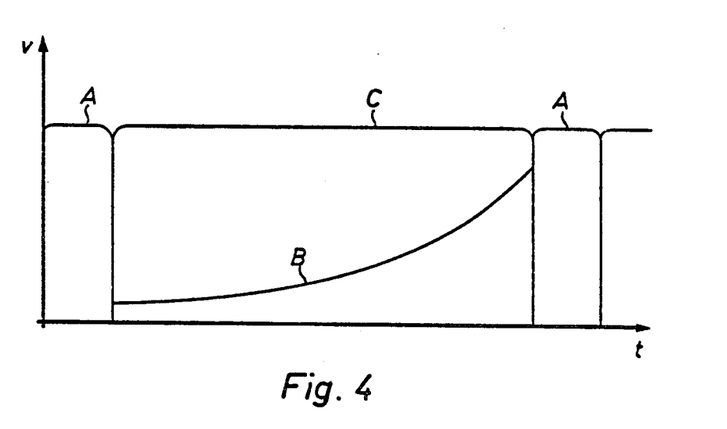
FIG. 4 is a diagram of the withdrawn residual gas volume stream as a function of time for the process of FIG. 1.

In contrast, FIG. 4 illustrates the effect of the inventive features of this invention on the process of FIG. 3. The variables entered on the ordinate and abscissa, as well as the curve designations are the same as in FIG. 3. It can be seen from FIG. 4 that the utilization of the control measures of this invention produces substantially constant residual gas volume stream. Furthermore, a shortening of the time of the third expansion phases E3 (curve A) becomes necessary, and the curve of the purging gas stream B obtained in this process deviates considerably from that of FIG. 3.

Figure 5:
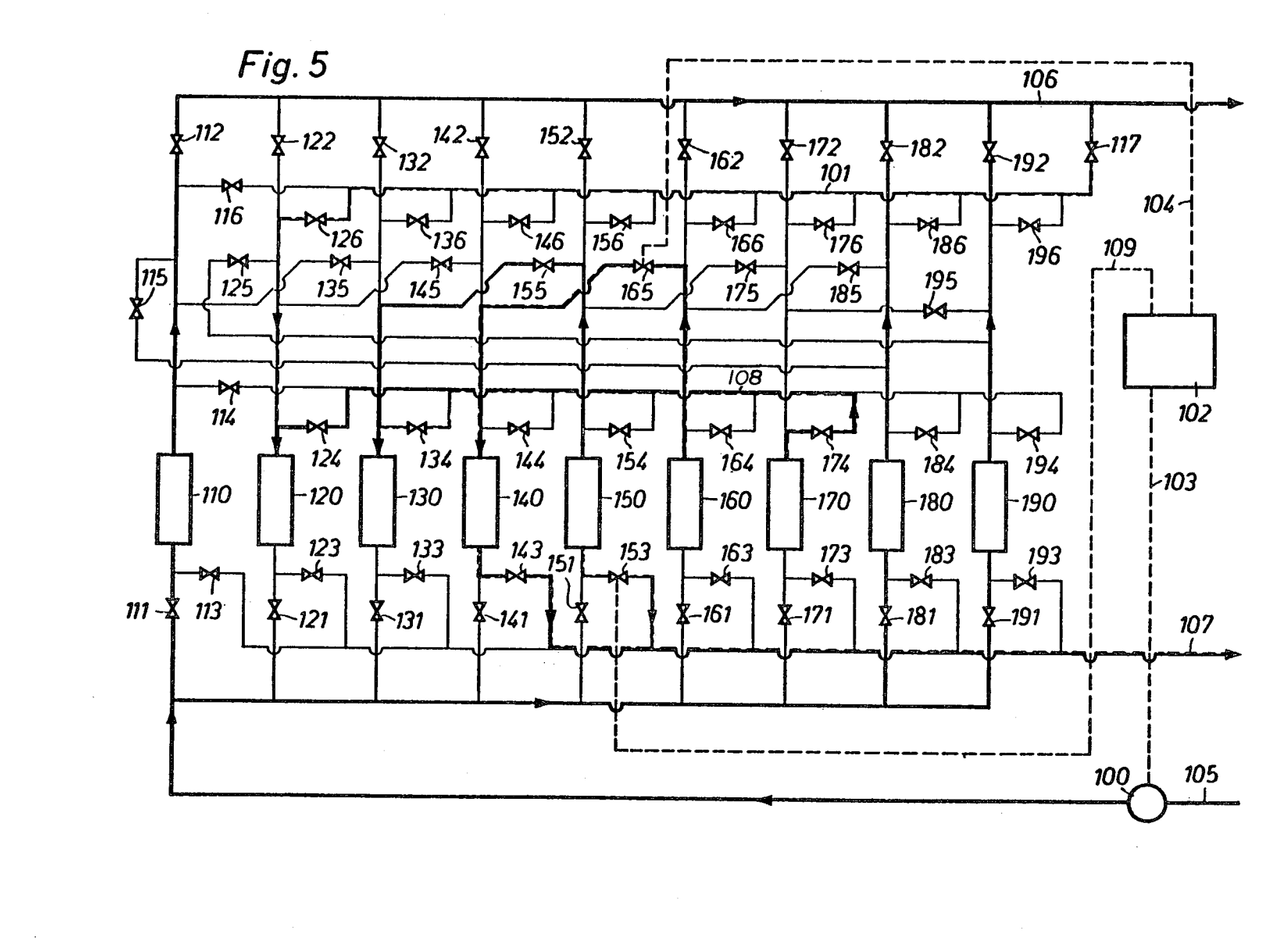
FIG. 5 is a flowsheet of the process of this invention used in an adsorption plant operated with nine cyclically reversible adsorbers.

FIG. 5 is a flowsheet of an adsorption process operated with nine cyclically reversible adsorbers, as disclosed in DOS 2,624,346, which has been modified to include the novel features of the present invention. Nine substantially identical adsorbers 110 through 190, each passing through respectively substantially identical switching cycles with a chronologically-timed displacement of one-ninth of the cycle are used in this process. The gaseous mixture which is to be purified or fractionated is introduced into the plant through a feed gas conduit 105. The product gas which has been freed of the adsorbed components is discharged through a product gas conduit 106 and the residual gas which is enriched in the previously adsorbed components, is withdrawn through a residual gas conduit 107. In addition, there is provided a pressure gas conduit 101 which can be connected through a valve 117 to the product gas conduit 106 or through valves 116, 126, 136, 146, 156, 166, 176, 186 and 196 to the outlet sides of the adsorbers 110, 120, 130, 140, 150, 160, 170, 180, or 190, respectively. The outlet sides of the adsorbers can also be connected to each other through a pressure equalization conduit 108 and through valves 114, 124, 134, 144, 154, 164, 174, 184 or 194, connecting each of the respective adsorbers with the conduit 108. The residual gas conduit 107 can be connected to the inlet sides of each of the respective adsorbers through valves 113, 123, 133, 143, 153, 163, 173, 183 and 193. The raw feed gas is introduced into, and the product gas is discharged from, the respective adsorbers through valves 111, 121, 131, 141, 151, 161, 171, 181 and 191, and 112, 122, 132, 142, 152, 162, 172, 182 and 192, respectively. Purging gas valves 115, 125, 135, 145, 155, 165, 175, 185 and 195 are provided to connect the outlet side of each adsorber to the outlet side of next-to-the adjacent adsorber, respectively, e.g., adsorber 180 with adsorber 110, adsorber 190 with adsorber 120, etc., as shown in FIG. 5.

A control device 102, preferably a programmable process computer, controls the operation of the entire plant. A quantity measuring unit 100, which is connected through a measuring line 103 to the control device 102, monitors throughput of the raw gas stream through the line 105 and transmits the measured data into the control device 102 which processes the data in a manner described above in connection with the process of FIG. 1. The control device 102 regulates the total mass or volume streams flowing through the purging gas valves 115, 125, 135, 145, 155, 165, 175, 185 and 195 in the purging phase, or the valves 113, 123, 133, 143, 153, 163, 173, 183 and 193, leading to the residual gas conduit 107 in the expansion phase. The valves of the two aforementioned groups are controllable valves, preferably with a linear opening characteristic, which are activated by previously determined, nonlinear signals. These valves are activated through separate signal lines, of which only two, lines 104 and 109, are illustrated in FIG. 5 for the sake of clarity.

Figure 6:
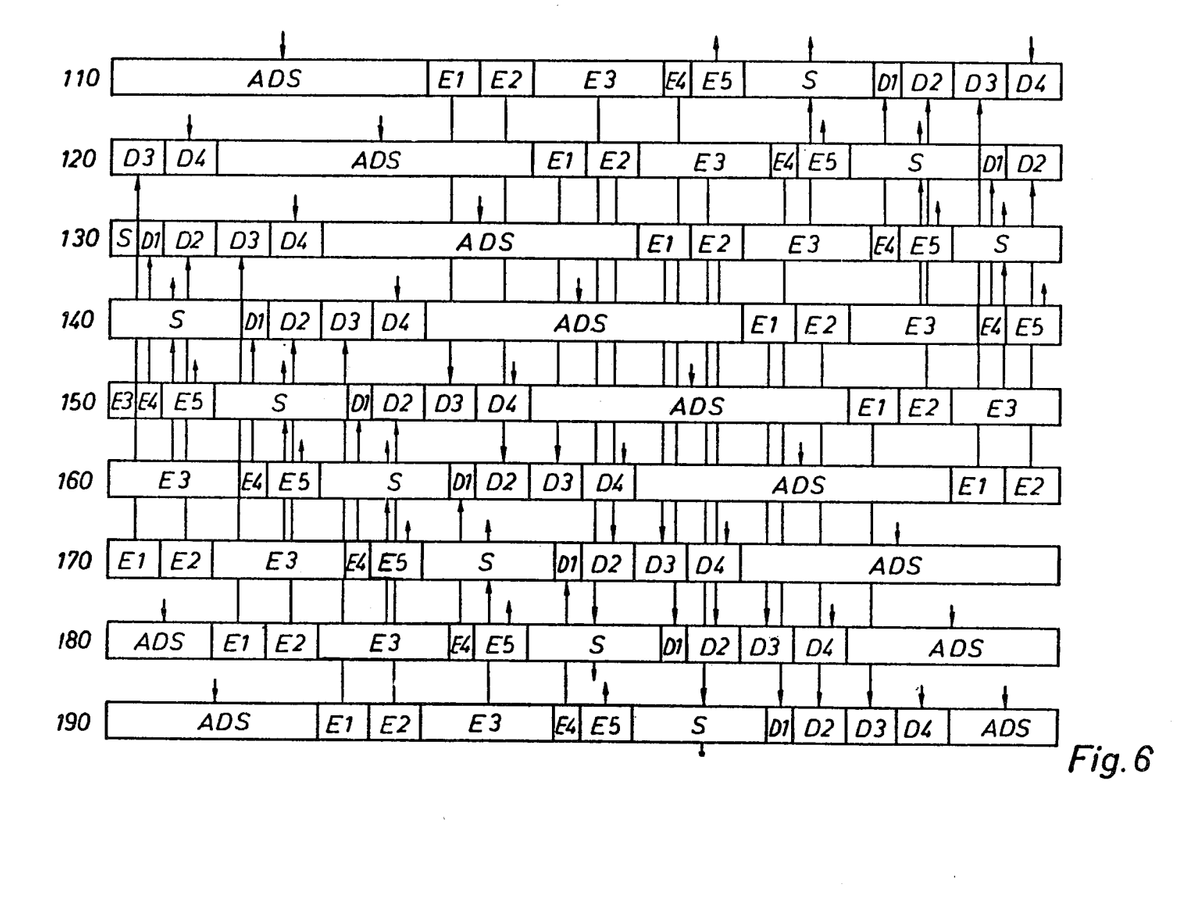
FIG. 6 is an operating sequence diagram for the process of FIG. 5.

FIG. 6 illustrates the operating sequence diagram of the process of FIG. 5. The nine horizontal bars represent adsorbers 110, 120, 130, 140, 150, 160, 170, 180 and 190, respectively. A single switching cycle comprises: an adsorption phase ADS; a first expansion phase E1 operated in pressure equalization with a third pressure build-up phase D3; a second expansion phase E2 operated in pressure equalization with a second pressure build-up phase D2; a third expansion phase E3 yielding a purging gas for a purging phase S; a fourth expansion phase E4 operated in pressure equalization with a first pressure build-up phase D1; a fifth expansion phase E5 yielding residual gas; a purging phase S; three pressure build-up phases D1 through D3 operated in pressure equalization with expansion phases; and a fourth pressure build-up phase D4 operated with a product gas.

The adsorption process is conducted in a manner substantially identical to that of the aforementioned DOS 2,624,346, except for the novel features of the present invention. The process is summarized below in connection with the discussion of FIGS. 5-8.

In FIG. 5, bold lines designate the phases conducted simultaneously with the first pressure build-up phase D1 and dashed lines designate the phases conducted simultaneously with the second pressure build-up phase D2 of the adsorber 130 (see FIG. 6 for additional explanation). During this time period, the adsorbers 110, 180 and 190 are in the adsorption phase ADS (illustrated in FIG. 5 by bold lines). The following phases, also illustrated by boldly drawn lines, take place: the adsorbers 120 and 170 are in pressure equalization with each other with their respective outlet sides communicating with each other through the opened valves 124 and 174 and through the pressure equalization conduit 108. The pressure in the adsorber 170 is reduced during this phase to a first intermediate pressure of atm. The gaseous friction discharged from the adsorber 170 comprises a gas which has remained in the void volume of the adsorbent packing after the termination of the adsorption phase, this gas having substantially the composition of the product gas. At the same time, pressure equalization also takes place between adsorbers 130 and 150, through the opened purging gas valve 155 connecting the outlet sides of the two adsorbers. The opening of this purging gas valve is not regulated during the pressure equalization phase; rather it remains opened at a constant value throughout this phase. During this pressure equalization phase, adsorber 150 undergoes the fourth expansion phase E4 during which pressure in this adsorber is reduced to a fourth, relatively low intermediate pressure.

During this fourth expansion phase, a gaseous mixture containing previously adsorbed components is discharged from the adsorber 150. The adsorber 160 is during this time in its third expansion phase E3 yielding, upon pressure relief to a third intermediate pressure, a purging gas for the adsorber 140. The purging gas enters the outlet side of the adsorber 140 through the controlled valve 165 and it adsorbs the gaseous components desorbing at that point from the adsorbent. This purging gas is then discharged through the opened valve 143 into the residual gas conduit 107. During this purging procedure a positive, although diminishing, pressure differential is maintained between the adsorbers 160 and 140, since the adsorber 140, in the purging phase, is at the lowest pressure in the process, whereas the adsorber 160 must pass through two more expansion phases before its purging phase. After the first expansion phase E1 of the adsorber 170 is terminated, it and the adsorbers 150, 130 and 120 are switched to the next phases in their respective cycles.

The phases of the adsorbers 120-170, which now take place simultaneously, are represented by the dashed lines in FIG. 5, while the simultaneously occurring adsorption phases of the adsorbers 110, 180 and 190 are represented, as before, by the boldly drawn lines. The adsorber 170 now enters its second expansion phase E2, operated through the opened valves 134 and 174 in pressure equalization with the adsorber 130, which is in its second pressure build-up phase D2. The gaseous mixture discharged from the adsorber 170 until a second intermediate pressure has been reached has substantially the composition of the product gas.

The purging of the adsorber 140 with the expansion gas discharged from the adsorber 160 is continued, as described above. The adsorber 150 simultaneously undergoes a fifth expansion phase E5 during which its inlet side is connected through the opened valve 153 to the residual gas conduit 107. The degree of opening of the valve 153 is regulated to discharge the expansion gas, substantially enriched in desorbed components, in a predetermined manner so that the total stream of the residual gas discharged through the conduit 107 remains substantially constant. The method of regulating this and other valves is discussed in detail below. The adsorber 120 is at this time subjected to the fourth pressure build-up phase D4, its outlet side being connected through the opened valve 126 to the pressure gas conduit 101, from which purified product gas, branched off from the product gas conduit 106 enters the adsorber 120 through the opened valve 117. During this final pressure build-up phase D4, the adsorber 120 is brought again to the adsorption pressure.

EXAMPLE 2

Natural gas separation with a plant as illustrated in FIGS. 5 to 8.

| Feed gas | 4,500 kmol/h |
|---|---|
| feed gas pressure | 30 bar (abs) |
| feed gas composition | 90 mol-% $CH_4$, 10 mol-% $C^{2+}$ |
| product gas; | 3,450 kmol/h |
| composition | 99 mol-% $CH_4$, 1 mol-% $C^{2+}$ |
| pressure | 29 bar (abs) |
| product gas II (residual gas) | 1,050 kmol/h |
| composition | 60.4 mol-% $CH_4$, 39.6 mol-% $C^{2+}$ |
| pressure | 1.5 bar (abs) |

TABLE 2

| Phase | | E 1 | E 2 | E 3 | E 4 | E 5 | S | D 1 | D 2 | D 3 | D 4 |
|---|---|---|---|---|---|---|---|---|---|---|---|
| time seconds | | 20 | 45 | 140 | 20 | 45 | 140 | 20 | 45 | 20 | 45 |
| pressure at the end of phase | bar (abs) | 25 | 14.5 | 6.8 | 3.9 | 1.5 | 1.5 | 3.9 | 14.5 | 25 | 30 |
| mean flow rate | mol/s | 307 | 313 | 122 | 453 | 292 | 292 | 453 | 313 | 444 | 137 |
| gas composition $CH_4$ content | mol-% | 98.7 | 98.3 | 97.8 | 96.7 | 69.5 | 57.5 | 96.7 | 98.3 | 98.8 | 99.0 |

It will be obvious to those skilled in the art that the schedule of Table 2 is merely illustrative and that a different set of data must be obtained for operating the process of this invention with different process gases to obtain desired results. However, from the above description, it will become apparent to the workers skilled in the art how to control the degree of opening of the respective valves in response to changing process conditions and product requirements for various process gases.

Figure 7:
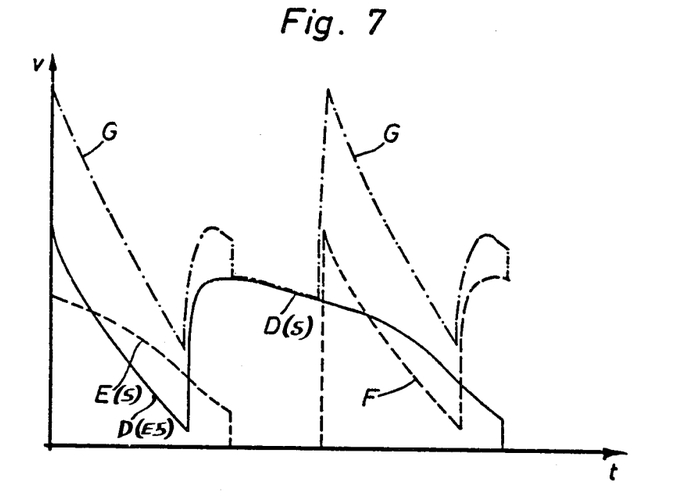
FIG. 7 is a diagram representing the volume stream of the withdrawn residual gas as a function of time for a conventional prior art process operating with nine adsorbers.
Figure 8:
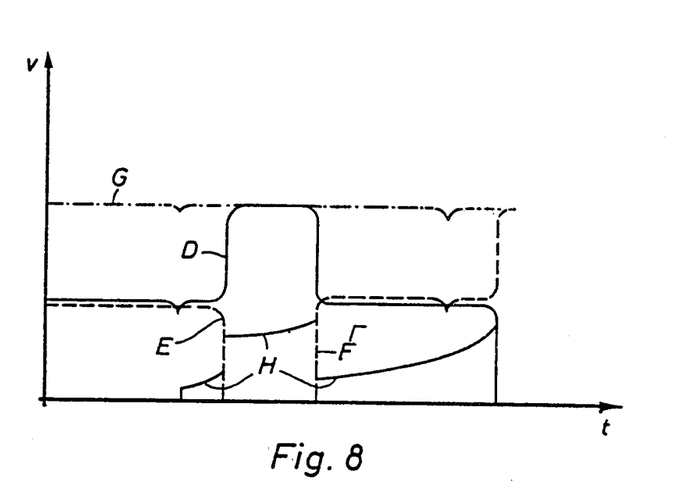
FIG. 8 is a diagram of the withdrawn residual volume stream as a function of time of the process of FIG. 5.

FIGS. 7 and 8 are diagrams of the volume stream of the residual gas as a function of time for the process illustrated in FIGS. 5 and 6. The diagram of FIG. 7 was obtained without utilizing the novel features of this invention, while the diagram of FIG. 8 was obtained with the use of the novel features of this invention. The curve D refers, for example, to the adsorber 110 and it represents the course of flow of the residual gas during the fifth expansion phase E5 and during the subsequent purging phase S. Curve E represents the purging phase of the adsorber 190, which continues for a time somewhat longer than the fifth expansion phase of the adsorber 110. Curve F represents the adsorber 120 entering the expansion phase E5, while adsorber 110 is still in its purging phase S. Curve G represents the total amount of the residual gas stream comprised of the sum of the volumes discharged during the fifth expansion phase E5 and during the purging phase S. Without the use of the inventive control measures of this invention, the total amount of the residual gas stream exhibits considerable chronological fluctuations as is seen from FIG. 7. These fluctuations are substantially eliminated when the inventive features of this invention are applied to the process, as is seen from FIG. 8. In order to obtain a residual gas flow shown by curve D in FIG. 8 the purging gas stream introduced for purging adsorber 110 is controlled as indicated by curve H in FIG. 8. The differences between curves D and curves H correspond to the desorbed components withdrawn during the purging phase.

However, it is seen from the diagram of FIG. 8 that the total volume gas flow of the residual gas, represented by curve G is substantially constant.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the adsorptive purification or fractionation of a gaseous mixture with several cyclically reversible adsorbers, by adsorbing at least one gaseous component of the gaseous mixture in the adsorbers, each of the adsorbers passing, with chronological displacement, through respectively substantially identical switching cycles, each switching cycle comprising an adsorption phase, at least one expansion phase, a purging phase operated with a purging gas and at least one pressure build-up phase, wherein the at least one expansion phase and the purging phase each produce gas fractions enriched in the at least one gaseous component, the sum total of the gas fractions comprising a residual gas stream, the improvement wherein the volume or mass of the residual gas stream is maintained chronologically substantially constant by regulating the respective volume streams and/or mass streams of the gas fractions obtained during the at least one expansion phase and the volume streams or mass streams of the purging gas introduced into the adsorber during the purging phase.

2. A process according to claim 1, characterized in that the purging gas used in the purging phase comprises the gas fractions discharged during the at least one expansion phase.

3. A process according to claim 2, characterized in that the gas fractions are withdrawn only from one of the several cyclically reversible adsorbers, and the residual gas stream comprises successively obtained gas fractions produced alternatively in the at least one expansion phase and the purging phase, wherein the volume streams and/or mass streams of the respective gas fractions are maintained chronologically substantially constant.

4. A process according to claim 2, characterized in that at least during a portion of each switching cycle the gas fractions are withdrawn simultaneously from at least two adsorbers, and the sum total of the volume or of the mass of the simultaneously withdrawn gas fractions is maintained chronologically substantially constant.

5. A process according to claim 4, characterized in that the lengths of time of the purging phase and of the at least one expansion phase are in the same relationship to each other as the total volumes or masses of the gas fractions obtained during the purging phase and the at least one expansion phase, respectively.

6. A process according to claim 5, characterized in that the volume streams and/or the mass streams of the gas fractions are regulated by means of controllable valves, the throughflow cross sections of the controllable valves being progressively enlarged as a function of time during the purging phase and the at least one expansion phase.

7. A process according to claim 6, characterized in that the controllable valves are activated by chronologically linearly variable signals.

8. A process according to claim 7, wherein the stroke-dependent opening characteristic of the controllable valves is adapted to the curve of the chronologically variable degree of the valve opening required to obtain the chronologically substantially constant residual gas stream.

9. A process according to claim 6, characterized in that the controllable valves have a stroke-dependent opening characteristic which follows a linear curve.

10. A process according to claim 9, wherein the chronological change of the degree of the valve opening is effected by a correspondingly shaped, nonlinear activating signal.

11. A process according to claim 9, characterized in that the activating signal is supplied by a process computer or by a pneumatically or hydraulically operating control means.

12. A process according to claim 1, wherein the duration of the switching cycles is varied according to a sensed and measured throughput quantity of the gaseous mixture into the adsorbers.

13. A process according to claim 12, wherein the activating signals transmitted to the controllable valves are decelerated or accelerated by a corresponding factor dependent on the sensed and measured throughput quantity of the gaseous mixture into the adsorbers.

14. In a process for the adsorptive purification or fractionation of a gaseous mixture with several cyclically reversible adsorbers, by adsorbing at least one gaseous component of the gaseous mixture in the adsorbers, each of the adsorbers passing, in a chronologically cyclically displaced manner with respect to each other, through respectively substantially identical switching cycles, each switching cycle comprising an adsorption phase, a purging phase operated with a purging gas, and at least one pressure build-up phase, wherein the at least one expansion phase and the purging phase each produce gas fractions enriched in the at least one gaseous component, the sum total of the gas fractions comprising a residual gas stream, the improvement comprising:

sensing and measuring the quantity of the gaseous mixture being passed into the adsorbers, proportionately varying the respective volume streams and/or mass streams of the gas fractions obtained during the at least one expansion phase, and proportionately varying the volume streams or mass streams of the purging gas introduced into the adsorber during the purging phase, in response to the sensed and measured quantity of the gaseous mixture, to thereby maintain the volume or mass of the residual gas stream chronologically substantially constant.

15. In an apparatus for the adsorptive purification or fractionation of a gaseous mixture, the apparatus including at least three interconnected adsorbers for adsorbing at least one gaseous component of the gaseous mixture, and each adsorber adapted to operate in identical switching cycles comprised of an adsorption phase, at least one expansion phase, a purging phase, and at least one pressure build-up phase, the adsorbers arranged for operation in a chronologically cyclically displaced manner with respect to each other, whereby the adsorbers are adapted to produce gas fractions enriched in the at least one gaseous component during the respective at least one expansion phase and the purging phase thereof, the sum total of the gaseous fractions produced by the at least three adsorbers comprising a residual gas stream, the adsorbers having respective outlets for releasing the gaseous fractions with the outlets connecting into one outlet line for passing the residual gas stream therethrough, and lines interconnecting the adsorbers with each other for passing gas released from one adsorber during the at least one expansion phase thereof to another adsorber as the purge gas therefor, the improvement comprising:

sensing means operatively associated with an inlet to said adsorbing apparatus for sensing and measuring the quantity of gaseous mixture entering said adsorbing apparatus;

a plurality of respective first outlet valve means having variable stroke opening characteristics for controlling volume or mass streams flowing therethrough, each outlet valve means of said plurality of outlet valve means arranged in the outlet of each of said at least three adsorbers through which said gas fractions are removed;

a plurality of second valve means having variable stroke opening characteristics for controlling volume or mass streams flowing therethrough, a respective second valve means of said plurality of second valve means arranged in each of one of the lines interconnecting each of said at least three adsorbers with each other for controlling the flow of a purge gas stream produced during the at least one expansion phase of one of the at least three adsorbers to another of the at least three adsorbers; and control means connected to said sensing means for receiving a signal corresponding to the sensed and measured quantity of gaseous mixture entering the apparatus, and respectively connected to each one of said respective first outlet valve means and to each one of said second valve means for transmitting a signal thereto, said signal corresponding to said sensed quantity of gaseous mixture entering the apparatus for individually varying the stroke openings of all the variable stroke opening valves to thereby maintain a substantially chronologically constant volume or mass residual gas stream.

* * * * *